(12) United States Patent
Lee et al.

(10) Patent No.: US 7,445,536 B2
(45) Date of Patent: Nov. 4, 2008

(54) MICRO AERIAL VEHICLE

(75) Inventors: Chang Yeal Lee, Bucheon (KR); Nam Kwon Song, Bucheon (KR)

(73) Assignee: Air Robot Co., Ltd., Seoul (KR)

( * ) Notice: Subject to any disclaimer, the term of this patent is extended or adjusted under 35 U.S.C. 154(b) by 167 days.

(21) Appl. No.: 10/595,022

(22) PCT Filed: Jun. 21, 2004

(86) PCT No.: PCT/KR2004/001486

§ 371 (c)(1),
(2), (4) Date: Jan. 26, 2006

(87) PCT Pub. No.: WO2004/113163

PCT Pub. Date: Dec. 29, 2004

(65) Prior Publication Data

US 2006/0121818 A1 Jun. 8, 2006

(30) Foreign Application Priority Data

Jun. 21, 2003 (KR) .................. 10-2003-0040449

(51) Int. Cl.
*A63H 27/133* (2006.01)
(52) U.S. Cl. ....................................... 446/37
(58) Field of Classification Search .................. 446/34, 446/36, 37, 57, 58
See application file for complete search history.

(56) References Cited

U.S. PATENT DOCUMENTS 4,065,873 A 1/1978 Jones

FOREIGN PATENT DOCUMENTS

| JP | 08103571 | 4/1996 |
|----|----------|--------|
| JP | 11049099 | 2/1999 |
| KR | 19990014324 | 4/1999 |
| KR | 1020020020562 | 3/2002 |

*Primary Examiner*—John Ricci
(74) *Attorney, Agent, or Firm*—Oppedahl Patent Law Firm LLC

(57) ABSTRACT

The purpose of this invention is to provide an ultra-miniature aircraft which is able to perform 'Vertical Take-off and Landing (VTOL)' and maintaining altitude when the vehicle is moving or when the horizontal velocity of a vehicle is at 0 by getting life only from a single rotor's rotation, and without using separate stabilizers such as a tail-rotor or a gyro. To fulfill the above purpose, this invention comprises: several blades in airfoil shape that are places in calculated angle and space; hubs that connect the blade to with a body of a vehicle; a rotor which gives lifting force with its spin; a spin-able axle which its vertical hem is bound to the hubs; a rotor drive that is needed to spin the rotor; a vehicle body that is placed right under the rotor in order to fly from the lift that is obtained by revolutions of the rotor; fixed-wings that are placed in certain angle and space around the outside of the vehicle body in order to reduce a reaction torque, which affects the body to turn the opposite direction of the rotor, from the rotor's movement; and a reaction-torque-counterbalancing-system on each of the above fixed-wings that offsets the reaction torque aggressively.

9 Claims, 6 Drawing Sheets

MICRO AERIAL VEHICLE

TECHNICAL FIELD

This invention is about the micro-size vehicle with rotor. In detail, the invention is able to perform 'Vertical Take-Off and Landing (VTOL)' by getting lift only from a single rotor's rotation, and maintaining altitude when the vehicle is moving or when the horizontal velocity of a vehicle is at 0 without using separate stabilizers such as tail rotors or gyros.

Specially, development of inventions such as ours could be used in RC (Radio Control System) airplanes in less expensive ways. Moreover, the invention could be used for a small helicopter which gathers information on areas where there was a disaster, or areas where geographic exploration is needed. Also, it could be used for many military purposes.

BACKGROUND ART

Airplanes are generally divided in two categories; fixed-wing and rotary-wing. Fixed-wing aircrafts get life from either propellers or engine's thrust; there are the ones that we generally call the 'airplane.' Rotary-wing aircrafts get life and steering forces from revolutions of the rotors.

Now, helicopters fit in the rotary-wing aircraft because it gets most lift for VTOL and even cruising from movements of rotors. So, the Micro Aerial Vehicle from our invention also has same advantages and problems of helicopters because our invention also gets lift from the rotor's spin.

Information that is related to our invention from the above is, that the vehicle needs to effectively gain force to lift body and overcome resistance force only with the rotor's movement, and that it needs to be able to counterbalance the reaction torque, which affects the body itself and its flying ability. But, Single Rotor Helicopter, which is most widely used helicopter contemporarily, has the main rotor on top of a body and has a tail-rotor at its tail. From the main rotor, the helicopter gets abundant lift and thrust force for vehicle's flying ability, and from the helicopter's tail-rotor's rotations, it is possible to cancel the reaction torque on the moving body.

There are also other types of helicopters other than the single rotor helicopter, such as coaxial rotor, side-by-side rotor, and tandem rotor helicopter, but all these helicopters counterbalance the reaction torque by having two rotors spinning in different direction.

From the below explains how the above theory could be adopted to the ultra miniature helicopters.

FIG. 1 is about the vehicle that gets lift from the rotation of single-rotor, and that does not have devices to counterbalance the reaction torque. FIG. 1a is the state of the vehicle before flying and FIG. 1b shows the status of the body flying from rotor's spin. As you see in FIG. 1a, that is attached to the body (2) spins at same time while the drive axle (3) spins. Bottom of the drive axle (3) is attached to the motor (4), which causes for the rotor (1) to spin. Dotted line under the bottom of the motor indicates the power supply line, and the motor spins from getting power from the power supply. As it is indicated on FIG. 1b, when the power is supplied to the motor through the line, the body can take off by the lift it gets from rotor's rotations (Circular surface above the body (2) indicates the imaginary surface formed from the spinning rotor.) At this time, if the direction of the rotor's movement is in counter clockwise as it is indicated by the arrow, the body which is placed under the rotor gets reaction torque in clockwise direction because the rotor spins in different direction. So, body (2) would keep spinning clockwise, and the spinning force would get stronger and stronger as the rotor's force is increased. This movement of the body would break the balance of force which needed for the vehicle to cruise safely, and as a result of this movement, the body would not be able to fly perpendicular to the ground but fly tilted and in a motion that draws spiral, which will surely cause the vehicle to crash on the ground.

As you see, any vehicle with a single rotor would need a device that counterbalances reaction torque like tail-rotor from single-rotor helicopter. This is the only known way to stabilize the vehicle while it is cruising and only known possible way to control and steer the vehicle. To solve such problems, existing RC helicopters either have a tail-rotor to stabilize, or have four different rotors placed in symmetrical place, each pair spinning in different directions in order to cancel the reaction torque that is affecting the vehicle. Moreover, it is usual to have gyro equipped for more stabilization.

But, these equipments for counterbalancing the reaction torque are too expansive for most people, resulting in rarity of RC airplanes. Also, if the plane uses tail-rotors, it requires connecting system such as gear box that adds weight onto the model, and it will result in very complicated system. So, it is almost impossible to use RC helicopters that cost about $1000 for experimenting in small helicopters, and problems such as tail-rotors and other stabilizing systems limit the development of ultra miniature air vehicle because of the increased size of model due the above system. And stabilizing the movement of ultra miniature airplane is focused on already existing airplanes. Even though the micro airplanes that follow the system of single rotor helicopter have advantages of being small and easily manufactured due to its simple structure, the development of such product is not successful because of lack of technology in canceling the reaction torque from the rotor. Moreover, the development of such small vehicles'control over flying is almost never studied.

DISCLOSURE OF THE INVENTION

To solve above problems, this invention is intended to offer a system which counterbalances the reaction torque that is simple, less expansive, and light on single rotor micro-sized aerial vehicle which can perform VTOL.

Also, the invention intends to give clues on developing ultra miniature aerial vehicle that flies safely and stably while the power is supplied, and which allows the controller to manipulate the vehicle's movement on one's will by supporting the invention with such a reaction torque canceling system.

To achieve above goals, the vehicle needs to posses:

Several blades in airfoil shape that are places in calculated angle and space.

Hubs that connect the blade to with a body of a vehicle.

A rotor which gives lifting force with its spin.

A spin-able axle which its vertical hem is bound to the hubs.

A rotor drive that is needed to spin the rotor.

A vehicle body that is placed right under the rotor in order to fly from the lift that is obtained by revolutions of the rotor.

Fixed-wings that are placed in certain angle and space around the outside of the vehicle body in order to reduce a reaction torque, which affects the body to turn the opposite direction of the rotor, from the rotor's movement.

The fixed-wings on the invention possesses ability to rotate, which would cancel the reaction torque on the body by letting the air flow from below the blades through circular motion the blades make.

The fixed-wings on the invention are designed to be bent allowing blades to change the angle and surface to be controlled in order for the wings to adjust to the air flow formed from rotations of rotors.

The fixed-wings on the invention are placed around the body in certain angle and space in order to reduce or remove the reaction torque formed from the rotation of the rotors. Also, each blades are place to be tilted in certain angle so the air flow to act on the blades to spin on opposite direction of the rotor, which then counterbalance the reaction torque.

The ultra miniature aerial vehicle according to the invention have the radio receiver which receives signal from the remote control, control part which converts the radio signal to an electric signal that controls the rotor drive, and the power supply which supplies power to the control part and the rotor drive.

The micro aerial vehicle according to our invention has the power supply in the remote control in order to supply power on the rotor drive, and as the power is confirmed, power is supplied to the power supply on the vehicle and rotor drive through the power line.

3a is the prototype's three-dimensional draft 3b is the prototype's ground plan.

3c is a front view of the fixed-wing only.

Figure 4:
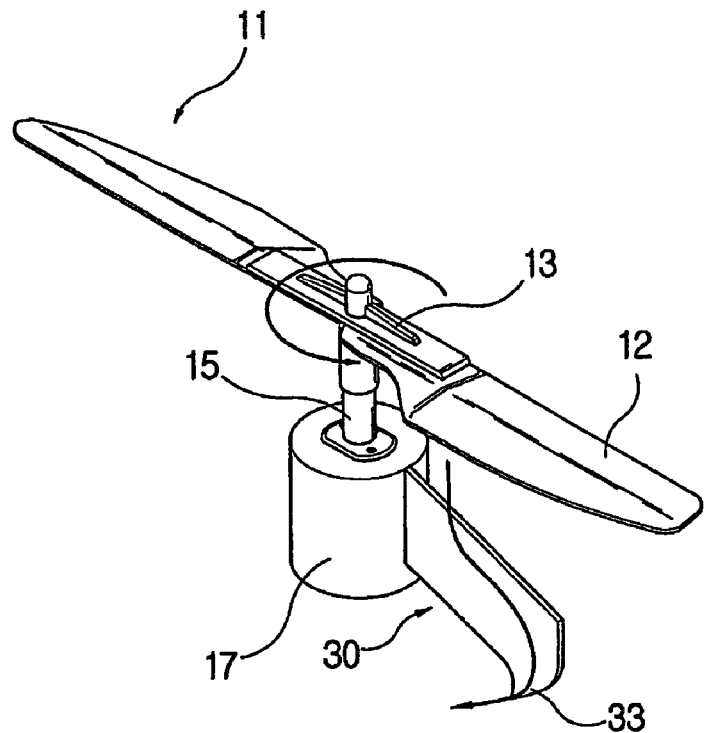

FIG. 4 indicates air flow, which caused by spinning of the rotor, flowing along side of the fixed-wing.

Figure 5:
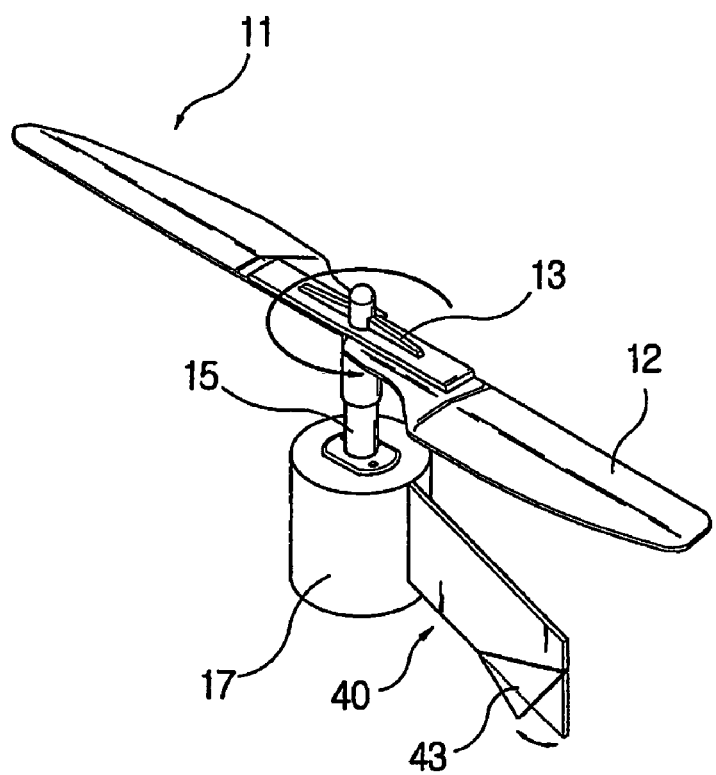

FIG. 5 is a variation of the fixed-wing prototype from our invention.

Figure 6:
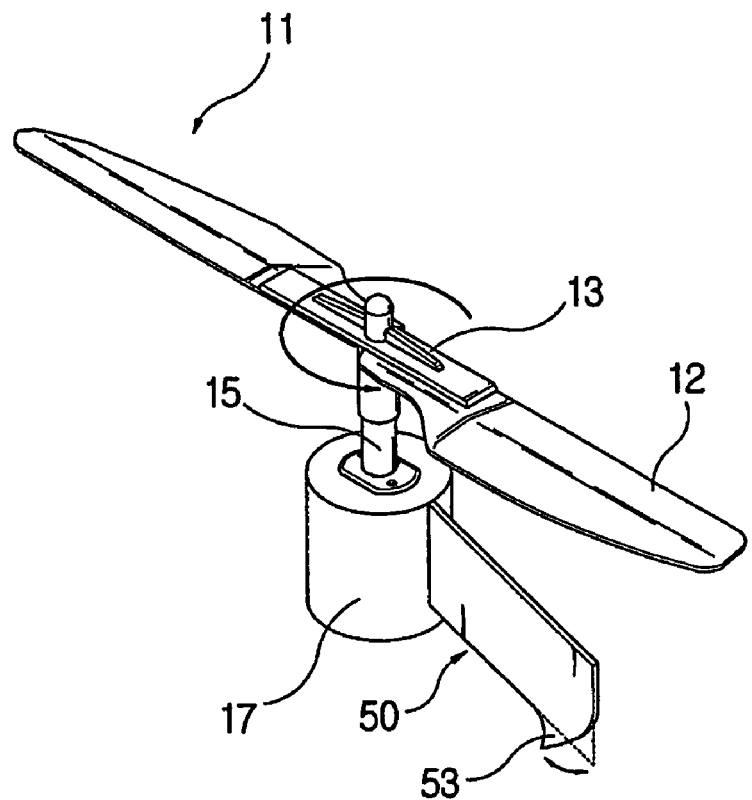

FIG. 6 indicates that it is possible for the fixed-wing to be bent.

Figure 7:
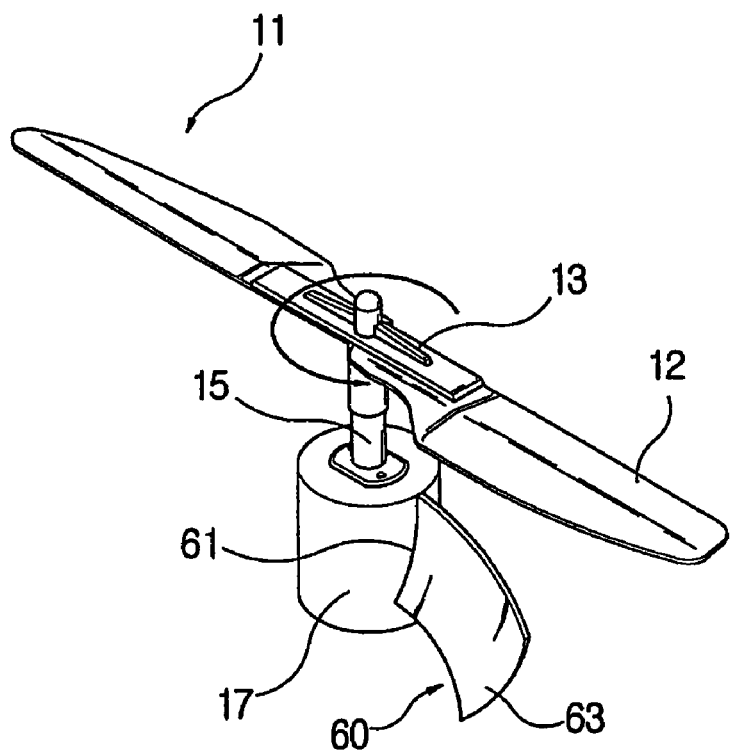

FIG. 7 is the draft of the second prototype of the fixed-wing.

Figure 8:
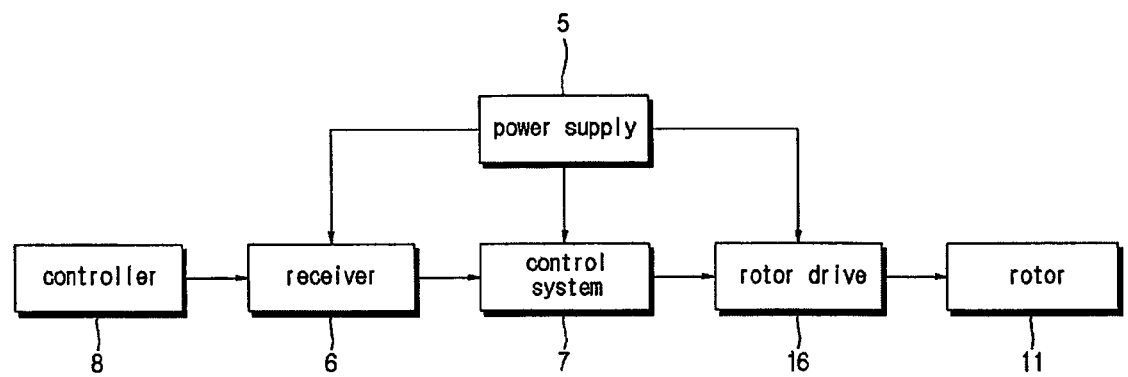

FIG. 8 is an example of the central algorithm of the Micro Aerial Vehicle.

Figure 9:
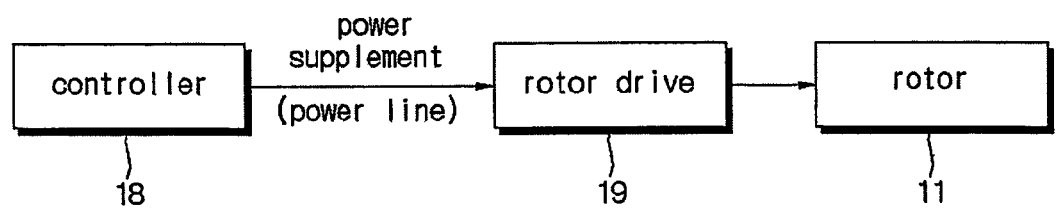

FIG. 9 is another example of the central algorithm of the Micro Aerial Vehicle.

PREFERRED EMBODIMENT FOR CARRYING OUT THE INVENTION

From the below, we will take a look at preferred embodiment of our invention through the figures that are attached. These are only suggestive examples, not the exact outline which would limit the use of the invention.

Figure 1A:
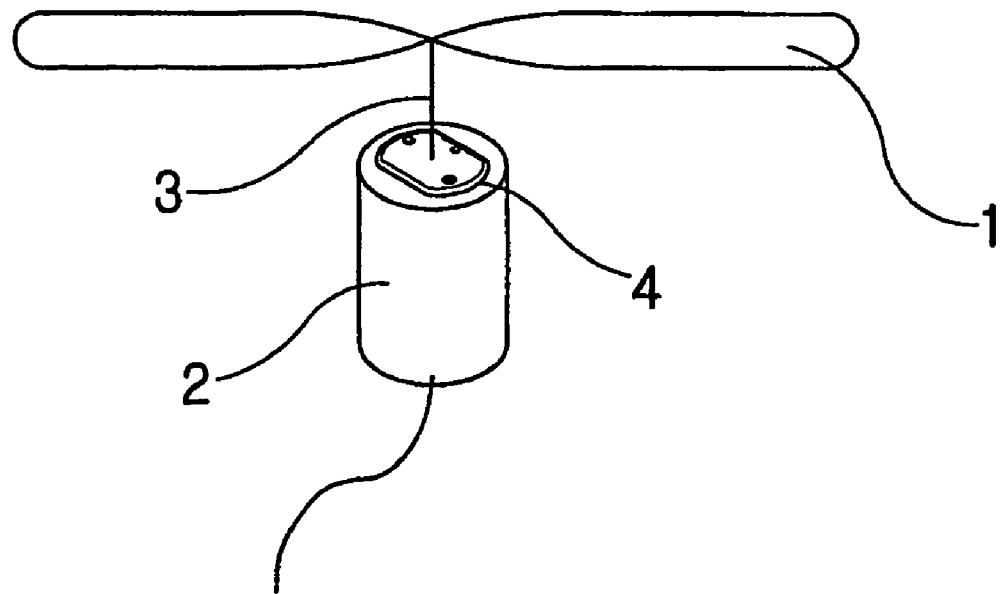
FIG. 1a shows the object before flying and FIG. 1b indicates the trace of the object while it is flying.
Figure 1B:
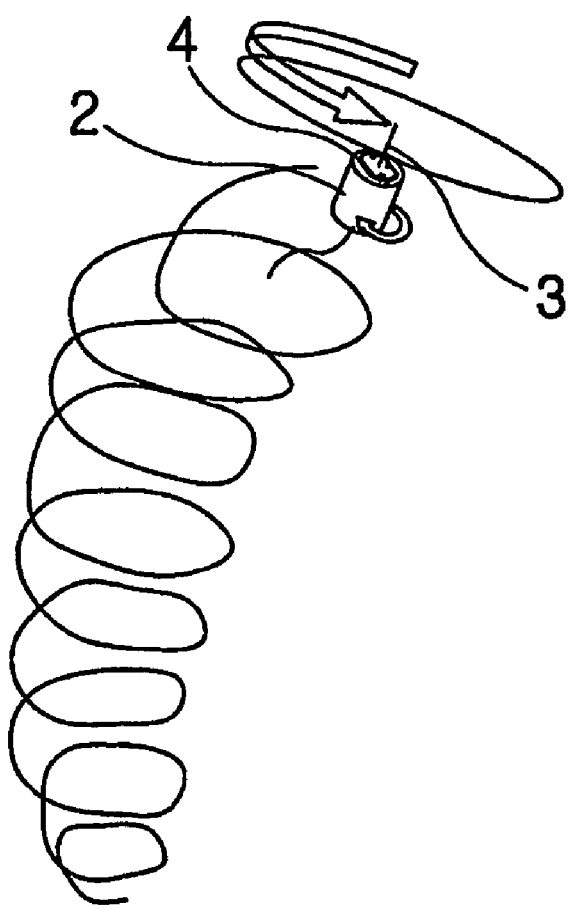
FIG. 1 is a blueprint of a vehicle flying with life only from a single-rotor without any separate device which prevents spin.
Figure 2:
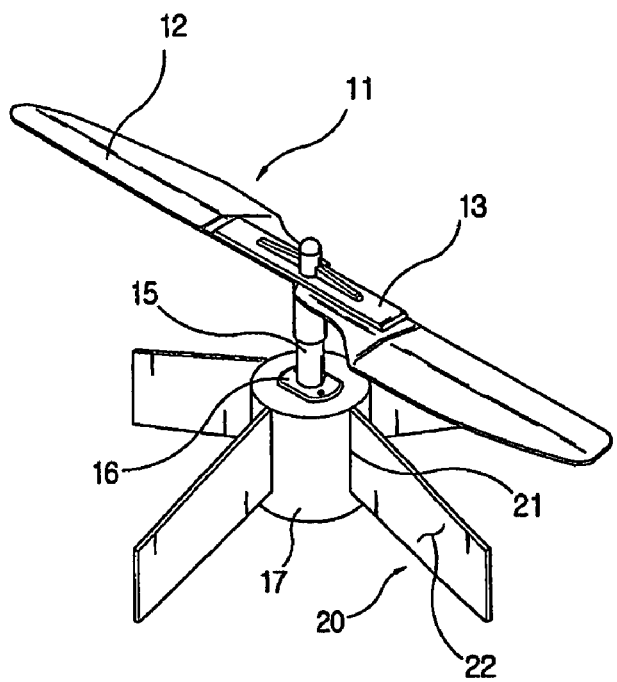
FIG. 2 is a three dimensional draft of a vehicle's prototype from the invention.

FIG. 2 is the three dimensional draft on the prototype of the micro aerial vehicle. As you see on the draft, pair of blades (12) shaped in airfoil is attached from hub (13) to the drive axle (15), and this drive axle is designed to spin as the rotor drive turns (16), which then will make the attached blades to spin. It is suggested that a motor to be used for rotor drive.

It is unnecessary to describe the structure of blades, because they are designed in a traditional air foil form. It is shown in FIG. 2 that only a pair of blade is used, but number of blades could be varied. (3, 4, 5 and so on)

As the rotor (11) turns, several blades in air foil shape also turns, and air above the blade would be sucked through the blades causing the body (17) to take off. The lifting force would be greater if there were more number of blades but the resistance due to the weight would reduce some portion of the lifting force, so it is suggested that the number of blades are limited to 2 or 3.

A pair of blades (12) could be formed separate and then be attached to the hub (13), making a complete rotor (11), but it is suggested above parts are formed in a whole, concerning the vehicle's weight and the rotor's durability.

Also, hubs (13), that are located in the middle of rotor, are suggested to be structured to be taken on and off with the vertical hem of the drive axle. In detail, drive axle (16) and rotor (11) should be designed to be taken on and off, but once connected with the rotor, it should be should be able to spin as the drive axle spins, and they should have enough durability to hold together over the body's weight, which is connected to the lower part of the drive axle.

The vertical hem of the drive axle (16) should have an angle, and the middle of the hub (13) should have a groove which fits the vertical hem's angle. Either that or the vertical hem of the drive axle and the hub can both have spirals and screws in order to fit in. Also, as you see on FIG. 2, a part where the hub (13) and the drive axle (15) connect could be shaped like a cylinder, where the drive axle (15) fits in the middle of the cylinder.

Moreover, rotor (11) and drive axle (15) could be a whole piece, where the one end of a drive axle (16) fits in the rotor drive, which is located in the middle of the body.

The structure of the vehicle could be same as the above or similar to those listed above.

Listed below are explanations on the structure and the specialty of the fixed-wings of the micro aerial vehicle.

Firstly, the fixed-wings (20) from the invention are placed in certain angle and space around the outside of the body. This is to reduce or remove the reaction torque due to the rotation of the rotor. Each fixed-wing directs towards the drive axle, and they are fixed tightly to the body. The number of fixed-wings that is attached to the body could be four, as it is shown in the draft, but to be more effective in reducing reaction torque and weight, number should be around 3 to 4, and they should be placed in symmetrical position. Also, fixed-wings are recommended to be a whole with the body, but they could be separate pieces that could be attached to the body.

The ends of the fixed-wings (21) are attached to the body, so when the body (17) rotates, fixed-wings (20) also rotate, and when that happens, the body also gets affected by the spinning force of the above.

The fixed-wings shown in FIG. 2 are in a rectangular shape but they could be in a rhombus or in a circular shape. In other words, the shapes of fixed-wings are not limited to the ones shown in the figure.

Listed below are the effects of the fixed-wings on the vehicle.

As the rotor (11) turns, air is sucked through the spinning blade which causes the body (17) to take off, but as it is mentioned above, the body tends to turn the opposite direction because of the reaction torque from the rotor. As a result, the single-rotor aerial vehicle without stabilizers would not be able to fly, and it is sure that the vehicle would crash in few seconds after the take-off.

But if the fixed-wings (20) are attached to the body (17) like our invention, then it could fly continuously as long as power is supplied.

That is because the air flow caused by the rotor's (11) motion, which flows through the rotor to the bottom does not only move perpendicularly, but it also may swirl around or go through in tilted angles. So, these types of unpredictable wind would go against the fixed-wings that are placed parallel to the drive axel, which would create force to resist the reaction torque.

Secondly, fixed-wings turn as the body (17) turns by reaction torque work naturally as a resistant to the air flow.

Lastly, the radius of the spinning body would get larger because of the attached fixed-wings and their weight. Thus, the fixed-wings themselves would reduce the speed of spinning body from the reaction torque, and that results in more stable cruising. And those wings are designed to use the air flow to cancel the reaction torque, which will enable the vehicle to fly in better condition.

Below are detailed explanations of above reasons with the help of attached drafts.

Figure 3A:
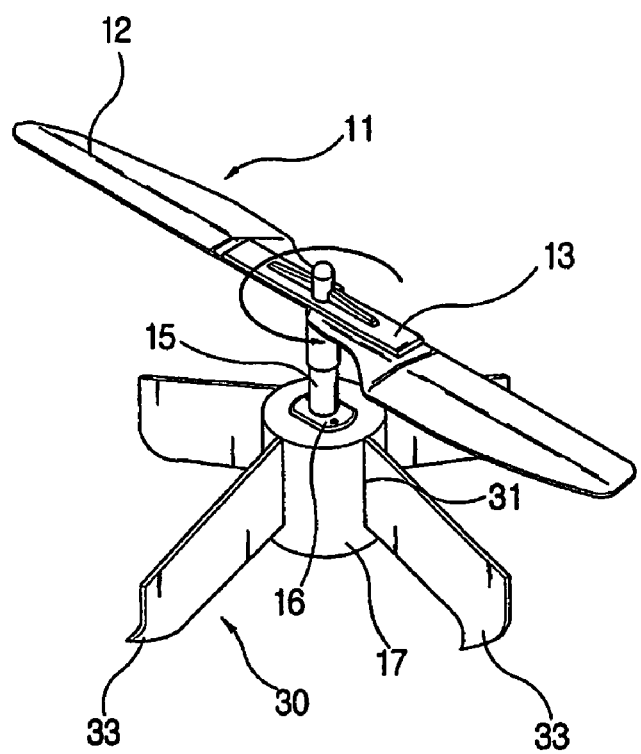
FIG. 3 is a three dimensional draft of a fixed-wing prototype.
Figure 3B:
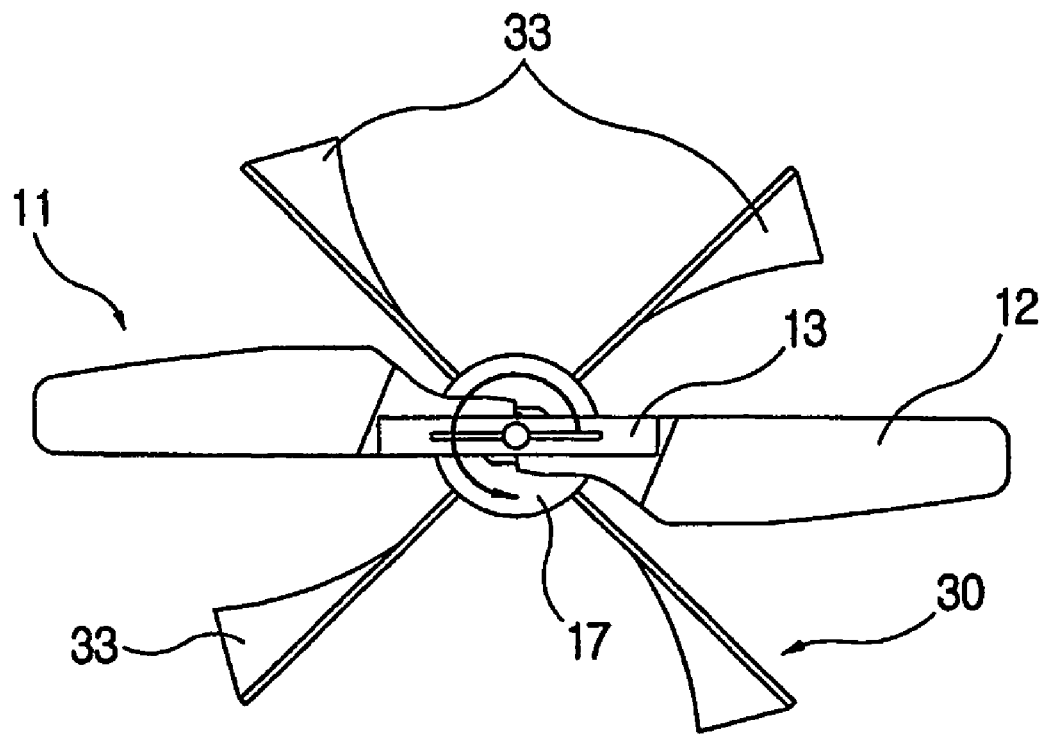
Figure 3C:
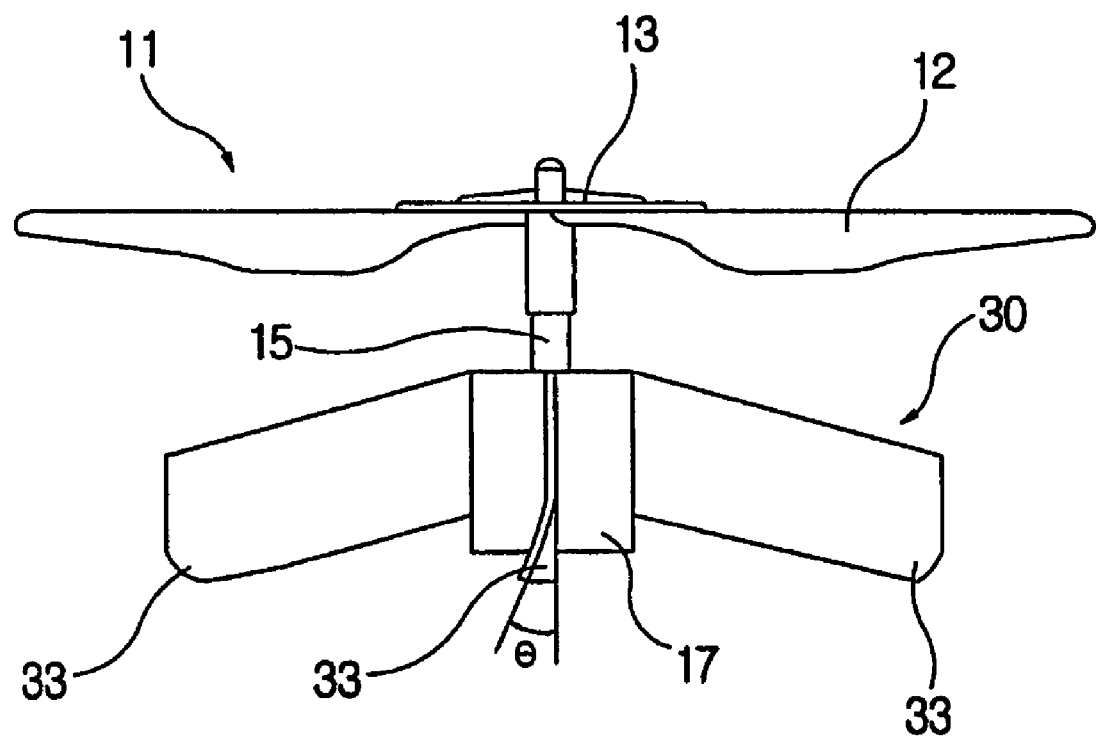

FIG. 3 is a prototype of the fixed-wings from our invention (FIG. 3a is a brief three dimensional draft, FIG. 3b is a brief ground plan, and FIG. 3c is a front view of the fixed wing.)

As you see in FIG. 3a, the fixed-wings (30) from the invention have parts that counterbalance the reaction torque (33). This part works by getting rotational force from blocking the air-flow, created from the rotor's (11) movement.

In other words, fixed-wings (30) are placed around the outside of the body (17) in certain angle and space. Each of the wings is fixed in direction of the drive axle (15). FIG. 3 is a prototype of the fixed-wings from our invention (FIG. 3a is a brief three dimensional draft, FIG. 3b is a brief ground plan, and FIG. 3c is a front view of the fixed wing.)

As you see in FIG. 3a, the fixed-wings (30) from the invention have parts that counterbalance the reaction torque (33). This part works by getting rotational force from blocking the air-flow, created from the rotor's (11) movement.

In other words, fixed-wings (30) are placed around the outside of the body (17) in certain angle and space. Each of the wings is fixed in direction of the drive axle (15). The fixed-wings then directly hit the airflow caused by the rotating rotor (11), which means the fixed-wings should have surfaces where the direction of the wind crosses thus creating more forces to reduce the reaction torque. This surface could be placed towards the top of the fixed-wings, (Under an assumption that the rotor (11) is top and the body (17) is bottom) but in this case, the air flow would be very fierce which would surely interrupt the vehicle's movement. Thus, the reaction-torque-canceling part should placed at the bottom of the fixed wing because then the air flow coming down from the rotor would flow against the surface of fixed-wings (30), then go through the bottom which results in enough torque against the spinning fixed-wings.

So, as it is shown in drafts, the bottom fixed-wings (30) are formed to be little rolled up or bet towards the direction of air flow coming down from the rotor.

But, because the reaction torque is formed from rotor's movement and the body follows rotor's movement, if the rotor is turning clockwise then the bottom of the wing should be bent counter clockwise and vice versa. The rotor drive according to our invention is suggested to be a motor, but it could be a one way motor which can perform both front and reverse rotation.

FIG. 3b depicts the top view from the rotor of FIG. 3a, and it shows that the reaction-torque—canceling-system is bent clockwise as the rotor turns counter clockwise to let the air flow through.

FIG. 3c is a front view of a single fixed wing. This figure also shows that the fixed wing is bent the opposite direction of rotor's movement. Angle ⊖ indicates how much the bottom of fixed wing should be bent, and as the size of ⊖ or the size of wing's surface get larger, the resisting force against wind also gets larger. In extreme case of strong resisting force, it is possible for the body (17) to turn in same direction with the rotor's movement. Thus, angle ⊖ and the surface of the counterbalancing-reaction-torque-system should be calculated and controlled to offset between the reaction torque from the rotor and the torque the bottom of the fixed-wing gets from the airflow, in order for the body to not spin nor shake while flying.

FIG. 4 shows the air flow coming down from the rotor through the fixed-wing of the prototype, and other wings are omitted for better understanding of the figure. As you see, air flowing down from the rotor flows along the surface of the fixed-wing, then the air flow hits the counterbalancing-reaction-torque-system (33), which then gives torque to the fixed wing (30) to cancel the reaction torque.

FIG. 5 is a variation of the prototype of the fixed wing, and it shows that it is possible for the counterbalancing-reaction-torque-system to be bent. As it is indicated in the figure, counterbalancing-reaction-torque-system (43) is located at the bottom of fixed-wings (40). This part could also even be in a folded form (the dotted line on the figure is to indicated the folded line.)

FIG. 6 shows that the fixed-wings themselves could be bent. As it is shown in the figure, material of the fixed-wings (50) should be able to bend in order to calculate the angle ⊖, and surface of the counterbalancing-reaction-torque-system. Also, the fixed wing could be folded as it was suggested in FIG. 5

FIG. 7 is the second prototype of the fixed wing. As it is indicated in the figure, the fixed-wings (60) from our invention are located around the side of body in certain angle and space, and the end of the wings are also fixed in an angle on the body towards the direction of the drive axle (150, which would let the bottom of fixed-wings to counterbalance the reaction torque caused by air flow coming down through the blade (12). Thus, in this case, there is not a special part that offsets the reaction torque but the whole fixed-wings directly act to equalize between the reaction torque and torque the fixed wing gives to the body (17)

Also, fixed-wings (60) in this case are designed to be able to bend at the bottom so the angle and the surface of the wings could be controlled to efficiently use the force of air flow coming down the rotor.

FIG. 8 shows the control algorithm of the micro aerial vehicle according to the invention. In this case, controller (8), like one of regular RC model's, sends signal, and when the receiver (6) receives the signal the control system (7) converts the signal to an electric one, which then controls rotor drive's (16) movement. (For this case, a power supply (5) could be batteries that fit into the body (17) of the vehicle.) Then the control system manipulates the movement of the vehicle by limiting amount of electrical power supplied to the rotor drive.

FIG. 9 is another example of the control algorithm of the micro aerial vehicle. In this case, a power supply of the rotor drive (19) is located on the controller (18), and as the user controls the vehicle, power is sent to the vehicle through a power line, manipulating vehicle's movement by limiting the amount of voltage sent to the vehicle.

The micro aerial vehicle that we tested according to the invention flew about 10 minutes when Lithium-Polymer batteries were used as power supply, with voltage being 6.5V and current being 0.16 A. (Any kind of separate receiver was not used.) The vehicle used for this experiment had length of 9 centimeters (3.54 inches, including the fixed-wings), and weight of 20 gram (0.706 ounces), showing the sufficient possibility as a use of an RC vehicle.

As it is explained above, the micro aerial vehicle according to the invention is able to fly stable due to the fixed-wing that counter balances the reaction torque, and the vehicle is able to maintain altitude while the velocity of a vehicle is at 0 if a right amount of voltage is given concerning its weight, size of fixed-wings, and supplied power.

Specially, this invention has a simple structure and the invention does not add to much weight on a vehicle. More than that, manufacturing the invention costs fairly cheap, which could drop price range of RC model helicopters tremendously, and allowing many more people to enjoy the RC helicopters.

Also, the invention could be used as experimental vehicle for researching the most suitable helicopters used in gathering information for various purposes, such as military, geographic, and in a region where there is a case of calamity Moreover, this invention might be a clue in developing even smaller aerial vehicle which could be controlled at a pilot's will.

The invention claimed is:

1. A micro aerial vehicle comprising:
several blades in airfoil shape that are placed in calculated angle and space;
hubs that connect the blades with a body of a vehicle;
a rotor which gives lifting force with its spin;
a spin-able axle having a vertical hem, the vertical hem being bound to the hubs;
a rotor drive disposed to spin the rotor;
a vehicle body that is placed right under the rotor in order to fly from lifting force that is obtained by revolutions of the rotor; and
fixed-wings that are placed in certain angle and space around the outside of the vehicle body in order to reduce a reaction torque, which affects the body to turn in a direction opposite to a rotation direction of the rotor, from the rotor's movement;
further comprising: a counterbalancing-reaction-torque-system on the fixed-wings that cancels the reaction torque given to the body by air flow, caused by a rotor's movement, coming down through the blades;
wherein the above fixed-wings are designed to be bent in order to control angle and surfaces where the above air flow is contacted.

2. The micro aerial vehicle of claim 1, further comprising:
a receiver which receives radio signals sent from a remote controller;
a control system which converts radio signals into electric signals, and operates the rotor drive according to these signals; and
a power supply which supplies power to the above control system and the rotor drive.

3. The micro aerial vehicle of claim 1, further comprising:
a power supply located in the remote controller; and
an electrical line that connects the power supply and the rotor drive where the power is sent through when power to operate the vehicle is provided by the above power supply.

4. A micro aerial vehicle comprising:
several blades in airfoil shape that are placed in calculated angle and space;
hubs that connect the blades to a body of the vehicle;
a rotor which gives lifting force with its spin;
a spin-able axle having a vertical hem, said vertical hem bound to the hubs;
a rotor drive disposed to spin the rotor;
a vehicle body that is placed right under the rotor in order to fly from the lifting force that is obtained by revolutions of the rotor;
fixed-wings that are placed in certain angle and space around the outside of the vehicle body towards the direction of the drive axle in order to reduce a reaction torque, which affects the body to turn in a direction opposite to a rotation direction of the rotor, from the rotor's movement;
above fixed-wings placed around the body are tilted in certain angle and bent to form a counterbalancing-reaction-torque-system which maximizes a force they get from the air flow, caused by the rotor's movement, through the above blades,
further characterized in that this force is used to cancel the reaction torque from the spinning rotor.

5. The micro aerial vehicle of claim 4, wherein the fixed-wings are designed to be bent in order to control angle and spaces where the air flow, which caused by the rotor's movement, comes down through the blades.

6. The micro aerial vehicle of claim 5, further comprising:
a receiver which receives radio signals sent from a remote controller;
a control system which converts radio signals into electric signals, and operates the rotor drive according to these signals; and
a power supply which supplies power to the above control system and the rotor drive.

7. The micro aerial vehicle of claim 5, further comprising:
a power supply located in the remote controller; and
an electrical line that connects the power supply and the rotor drive where the power is sent through when power to operate the vehicle is provided by the above power supply.

8. The micro aerial vehicle of claim 4, further comprising:
a receiver which receives radio signals sent from a remote controller;
a control system which converts radio signals into electric signals, and operates the rotor drive according to these signals; and
a power supply which supplies power to the above control system and the rotor drive.

9. The micro aerial vehicle of claim 4, further comprising:
a power supply located in the remote controller; and
an electrical line that connects the power supply and the rotor drive where the power is sent through when power to operate the vehicle is provided by the above power supply.

* * * * *